United States Patent [19]

Kanai et al.

[11] Patent Number: 4,825,233
[45] Date of Patent: Apr. 25, 1989

[54] DATA RECORDING CAMERA

[75] Inventors: Masaharu Kanai; Yasuo Yamazaki; Nobuyuki Kameyama; Yoshihiro Ide, all of Tokyo; Muneyoshi Sato; Mitsuo Yokota, both of Saitama, all of Japan

[73] Assignee: Fuji Photo Film Co., Ltd., Kanagawa, Japan

[21] Appl. No.: 119,076

[22] Filed: Nov. 10, 1987

[30] Foreign Application Priority Data

Nov. 12, 1986 [JP] Japan ............................ 61-173435[U]
May 14, 1987 [JP] Japan ............................ 62-57311[U]

[51] Int. Cl.$^4$ ............................................. G03B 17/24
[52] U.S. Cl. .................................................... 354/106
[58] Field of Search ........................ 354/105, 106, 109

[56] References Cited

U.S. PATENT DOCUMENTS 4,384,771  5/1983  Sakurada et al. ................. 354/105
4,742,369  5/1988  Ishii et al. ...................... 354/106 X Primary Examiner—Michael L. Gellner
Attorney, Agent, or Firm—Young & Thompson

[57] ABSTRACT

A data recording camera capable of recording a shooting date includes a memory for storing data as to the current date, a memory for storing data as to the birth date of an individual, an operation circuit for obtaining the age of the individual based on the data as to the current date and the birth date stored in the memories, and a display member for optically displaying the obtained age which is also photographically recorded on a film.

8 Claims, 9 Drawing Sheets (A) | 8 6 Year 10 Month 25 Day |—36

(B) | 1 7 Day 14 Hour 39 Min. |—36

(C) | YUMIKO 3 Years 11 Months |—36

DATA RECORDING CAMERA

BACKGROUND OF THE INVENTION

The present invention relates to a camera, and more particularly to a data recording camera capable of recording the age and/or name of a photographed individual on a film.

There are many known cameras which are capable of recording shooting date and time on a film. Some of such prior art cameras have an automatic date recording module which is a kind of microcomputer including a clock circuit having a crystal oscillator for generating a clock pulse and are adapted to record automatically the current shooting date, or date and time if desired, without the need for repeatedly setting the date and time in the camera. Considering that photographs are often made in order to preserve a family history, in particular a history of growing children, these auto-date cameras are quite useful.

Because the auto-date cameras known heretofore record only numerical data such as the shooting date, or date and time, on a photograph, it may often be difficult to recall the name and age of a photographed individual on a print many years later.

OBJECT OF THE INVENTION

It is, therefore, an object of the present invention to provide a data recording camera which can record the age of a photographed individual on a film.

It is another object of the present invention to provide a data recording camera which can record the age and name of a photographed individual on a film.

SUMMARY OF THE INVENTION

The data recording camera according to the present invention comprises first memory means for storing data as to the current date, second memory means for storing data as to the birth date of an individual, calculating means for calculating the age of the individual based on the data stored in the first and second memory means, means for displaying the resultant data as to age in a digital form, and exposure means for recording the age on a film.

According to a preferred embodiment of the data recording camera of the present invention, for the display means a liquid crystal display device is employed. If desired, the liquid crystal display device may take the form of a dot matrix display panel which can display the name of an individual as well as the age of the individual. Due to the provision of at least an age display device, a print made from a film exposed by the use of the data recording camera of the present invention makes it easy to know the age of a photographed individual even when the print is viewed many years later.

DETAILED DESCRIPTION OF THE INVENTION

Figure 1:
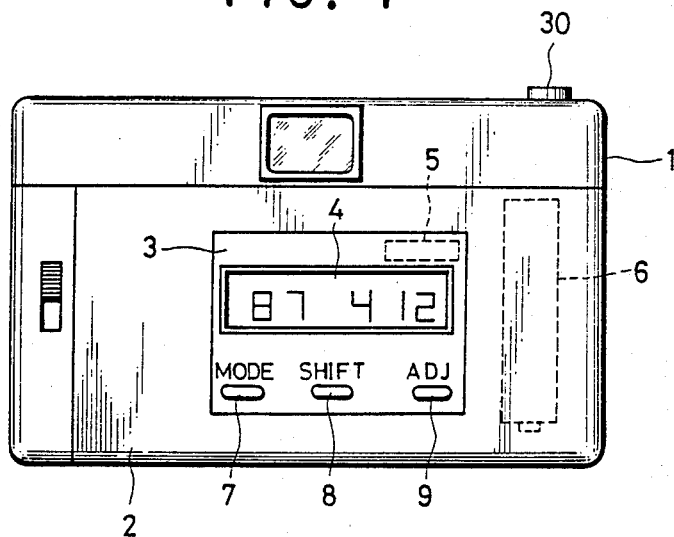
FIG. 1 is a rear view of a data recording camera embodying the present invention.

Referring now to FIG. 1, showing therein is a data recording camera embodying the present invention, which has a back cover 2 pivotally mounted on a camera body 1 to open and close body 1. The back cover 2 has a data recording unit 3 incorporated therein which comprises a data display panel 4 visible outside the camera and another data display panel 5 disposed inside the back cover 2 and facing the rear surface of a film in the camera. These display panels 4 and 5 are preferably of the type having a liquid crystal display panel well known per se. In particular, a reflection type liquid crystal display panel is desirably utilized for the data display panel 4. On the other hand, a transmission type liquid crystal display panel is utilized for the other embodiment comprised by the data display panel 5.

Provided in the data recording unit 3 are a printing mode selection switch 7, a shift switch 8, and an adjusting switch 9. Shown by a chain line in FIG. 1 is a battery cell 6 replaceably incorporated in the camera for supplying power to power-driven elements such as a film winding motor, an electric flash unit, or the like.

Figure 2:
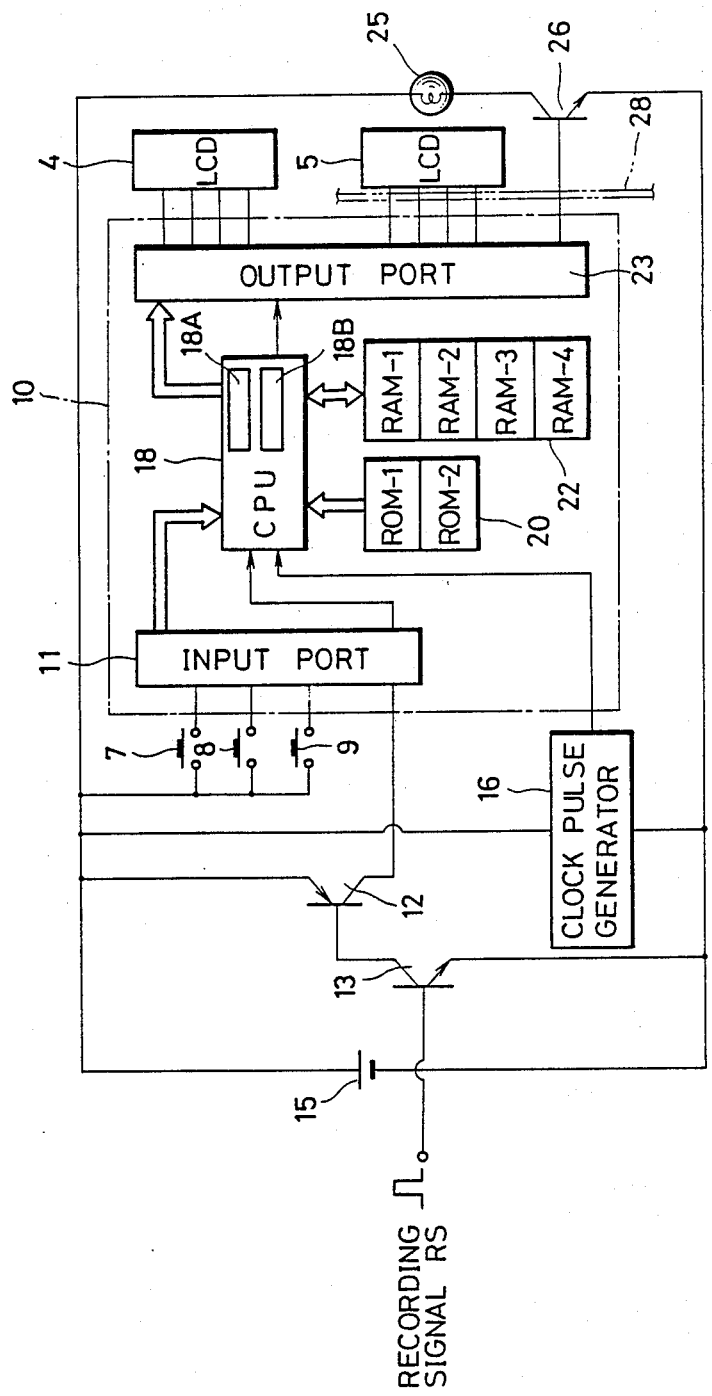
FIG. 2 is a functional block diagram showing an example of the data recording circuit.

Reference is now had to FIG. 2 showing the circuit configuration of the data recording unit 3 of FIG. 1, which includes a single tip microcomputer 10 indicated by a dotted line. Connected to an input port 11 of the microcomputer 10 are the above-mentioned switches 7 to 9 and an output terminal of a transistor 12 which is adapted to become conductive when a transistor 13 is turned conductive by application of a recording signal RS from the camera body 1 so as to provide the microcomputer 10 with a trigger signal through the input port 11. The recording signal RS is applied to the transistor 13 each time a shutter of the camera is actuated.

A power supply 15, which is preferably a lithium battery, is incorporated in the data recording unit 3 to supply power continuously to a clock pulse generator 16 including a crystal oscillator therein. A clock pulse generated by the clock pulse generator 16 is sent to a central processing unit (CPU) 18 of the microcomputer 10 which includes a pulse counter, and registers 18A and 18B. Stored in the registers 18A and 18B are data as to the current date (day, month and year) calculated based on the counted number of clock pulses and data as to the time (hour and minute), respectively. The data as to date is daily renewed automatically as is well known in the art.

Connected to the CPU 18 are ROM 20, RAM 22, and an output port 23. This output port 23 includes a driver for driving the liquid crystal display panels 4 and 5 to display the resultant data in the form of figures indicating a date (year, month and day) from the CPU 18.

The ROM 20 comprises ROM-1 and ROM-2 which have address areas different from each other. Stored in the ROM-1 is an operation program for calculating the current date and time based on the counted number of clock pulses, a program for executing a process according to signals from the input port 11, and a driving program by which the liquid crystal display devices 4 and 5 are controlled. On the other hand, stored in the ROM-2 are the data as to the date and time calculated in the CPU 18, and character pattern data used to display data stored in RAM 22 including RAM-1 to RAM-4 which will be described in detail later, on the liquid crystal display panels 4 and 5.

The RAM-1 is provided to store data of the most recent day on which the camera was used. If the camera is used more than once in the same day, the most recent day is the same day the camera is used. For this storage, data in the RAM-1 are replaced with the data as to date set in the register 18A when the transistor 12 is turned conductive by application of a recording signal RS. In the RAM-2, data of the next-most-recent day, which means the most recent day on which the camera was used prior to the date stored in the RAM-1. This storage of the next-most-recent date in the RAM-2 will be described later. Each of the RAM-3 and -4 is used to store data as to the birth date of an individual, which is entered manually.

There is a lamp 25 as a light source disposed behind the display device 5, which emits light when a transistor 26 is maintained conductive by application of a recording signal RS. Light from the lamp 26 passes through a transparent pattern of the display device 5 to reach the film 28 so as to record an image of the transparent pattern which is a date comprising a plurality of figures.

Figure 4:
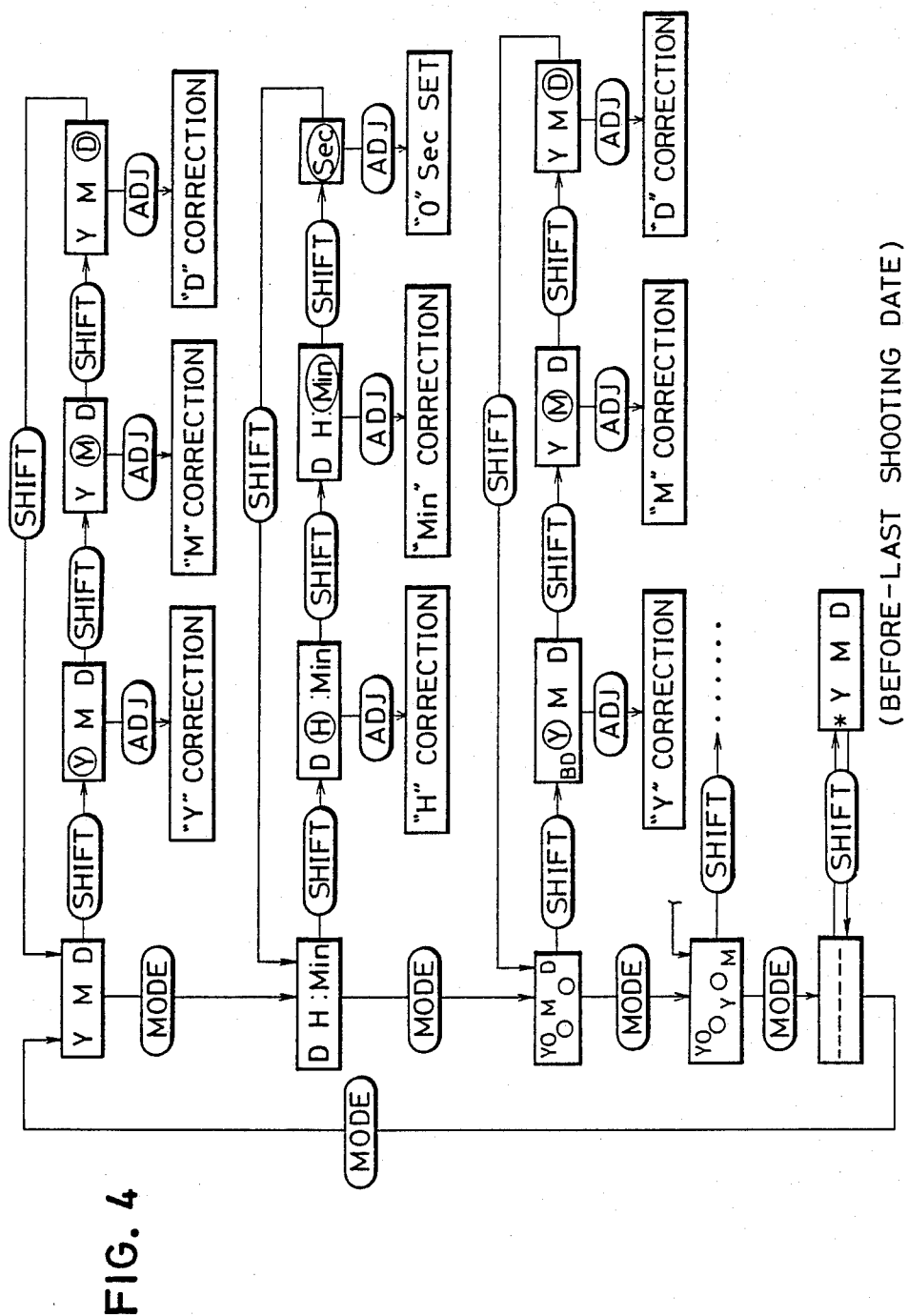
FIG. 4 is an explanatory diagram showing a mode changing operation of the data recording camera of the present invention.

In use of the data recording camera of this invention described above, in an initial condition wherein the data recording camera is set to a "date recording" mode, the same date is displayed on both of the display devices 4 and 5 according to the data as to the date stored in the register 18A as is shown in FIG. 1. If a shutter actuation button 30 is operated or depressed during the "date recording" mode, a recording signal RS is produced and turns the transistor 26 conductive to activate the lamp 25 to limit recording light which passes through display panels 5 and forms an image of figures indicating the shooting date on a film 28. When a date correction or readjustment is required, the shift switch 8 is at first operated to designate the items to be corrected or adjusted, for example the year, month or day, and then the adjusting switch 9 is operated to correct or adjust the selected or designated item. This date adjustment operation is shown in detail in FIG. 4 wherein the items under adjustment are explanatorily circled but are actually indicated by the corresponding indicators 7 to 9 flashing.

Figure 3:
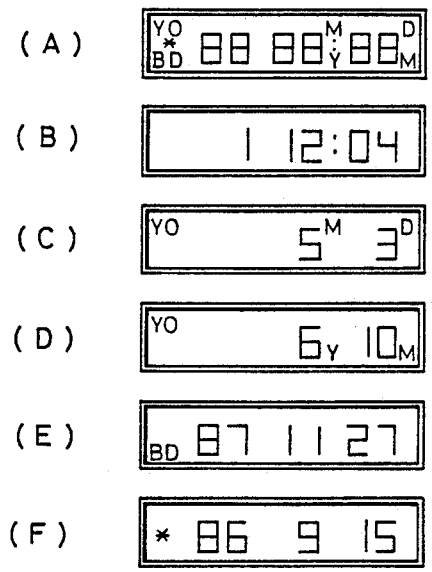
FIG. 3 is a series of illustrations showing various patterns of display of the liquid crystal display device.

When the mode selection switch 7 is operated again, a signal is emitted and transmitted to the CPU 18 through the input port 11. The transmission of the signal causes the CPU 18 to set the camera to a time recording mode, displaying data as to time on the respective display panels 4 and 5 according to the data as to time in the register 18. As a consequence, several figures are displayed on the respective display devices 4 and 5 to indicate time, namely day, hour and minute, as is shown in FIG. 3(B). At this time, when the shutter actuation button 30 is operated, the indicated time is recorded on the film 28. FIG. 3(A) shows explanatorily the possible indicia on the display panel 4.

Figure 5:
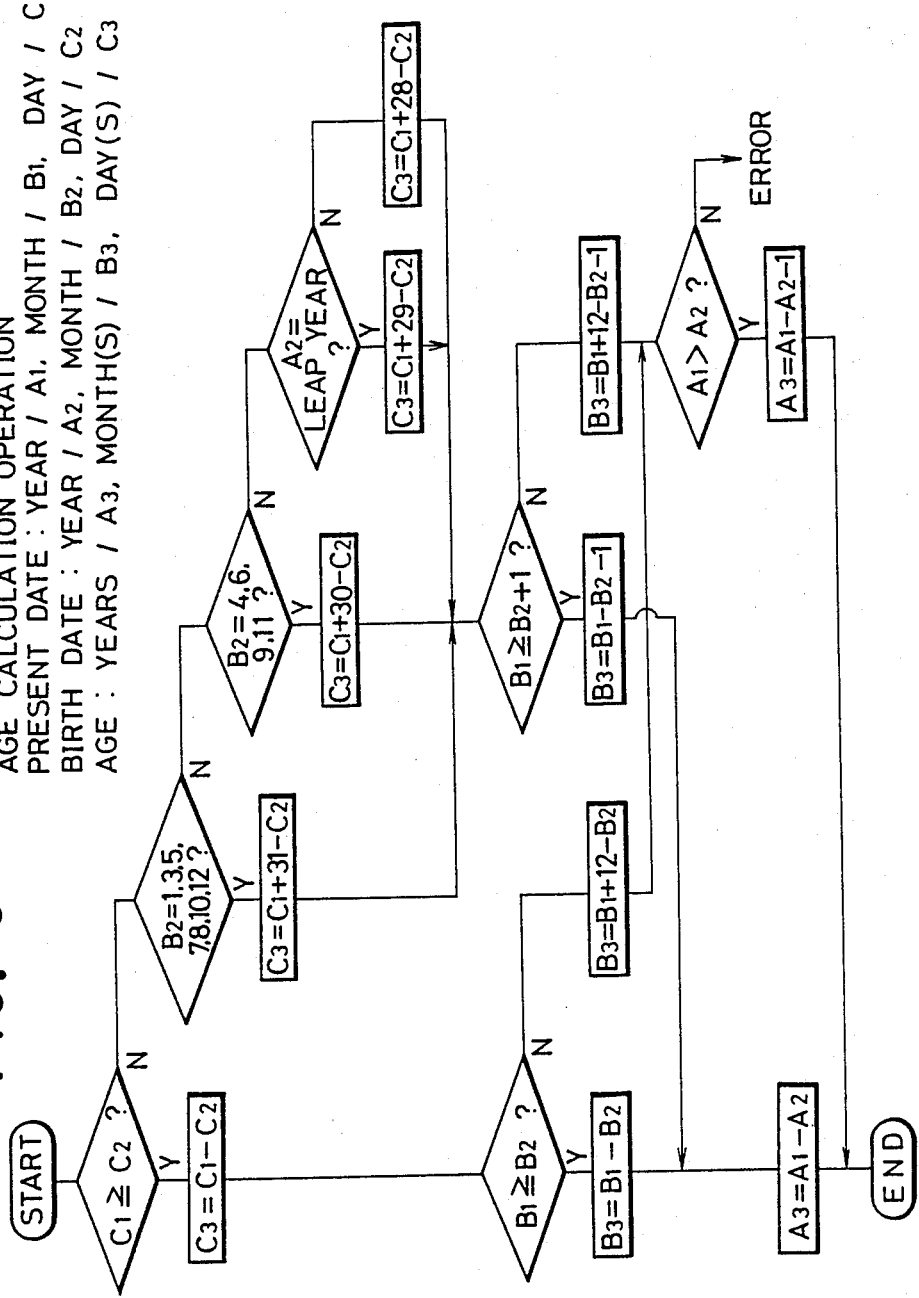
FIG. 5 is a flow chart showing a process for calculating a birth date.

When the mode selection switch 7 is operated once again, the data recording camera is set to an "age recording mode". In this mode, the CPU 18 retrieves the data as to the current date from the register 18A and the data as to the birth date of an individual from the RAM-3 and processes these data according to an operation sequence shown in FIG. 5 to calculate the age of the individual whose birth date is stored in the RAM-3. Data as to the calculated age is stored in the register 18B of the CPU 18 and is, on the other hand, displayed as figures as well as a direction such as "YO" (years old) on the display devices 4 and 5 as is shown in FIGS. 3(C) and (D). If an individual is under one year of age, the data as to age is indicated by numbers of months and days, as well as by indications of M (month) and D (day) as is shown in FIG. 3(C). On the other hand, if an individual is over one year of age, the age is indicated by year and month as is shown in FIG. 3(D). Therefore, by memorizing the birth date of an individual, for example a child, in the RAM-3, the present correct age of this individual can be automatically recorded on the film 28 as well as his or her image unless the stored birth date is changed. For simplicity of display, each year is indicated by the last two digits of the year.

The birth date in the RAM-3 can be changed by setting the camera to the "age recording mode" and then operating the shift switch 8 to reset a "birth date setting" mode in the CPU 18. This operation causes the display panel 4 to display a direction word "BD" (birth date) and the date stored in the RAM-3, as shown in FIG. 3(E). Then the adjusting switch 9 and the shift switch 8 are operated in this order for each item to change the birth date. It is to be noted that the RAM-4 is used to store the birth date of another individual.

Another operation of the mode selection switch 7 sets an "off-recording" mode in the camera so as to prevent any one of date, time and age from being recorded on the film even when a recording signal RS is emitted upon shutter release.

In the "off-recording" mode, a next-most-recent shooting date on which the camera was used can be displayed by operating the shift switch 8. Specifically, if the shift switch 8 is operated, the CPU 18 retrieves and displays the data as to this date in the RAM-2 as figures with a special direction mark "*" on the display device 4 as is shown in FIG. 3(F).

Figure 6:
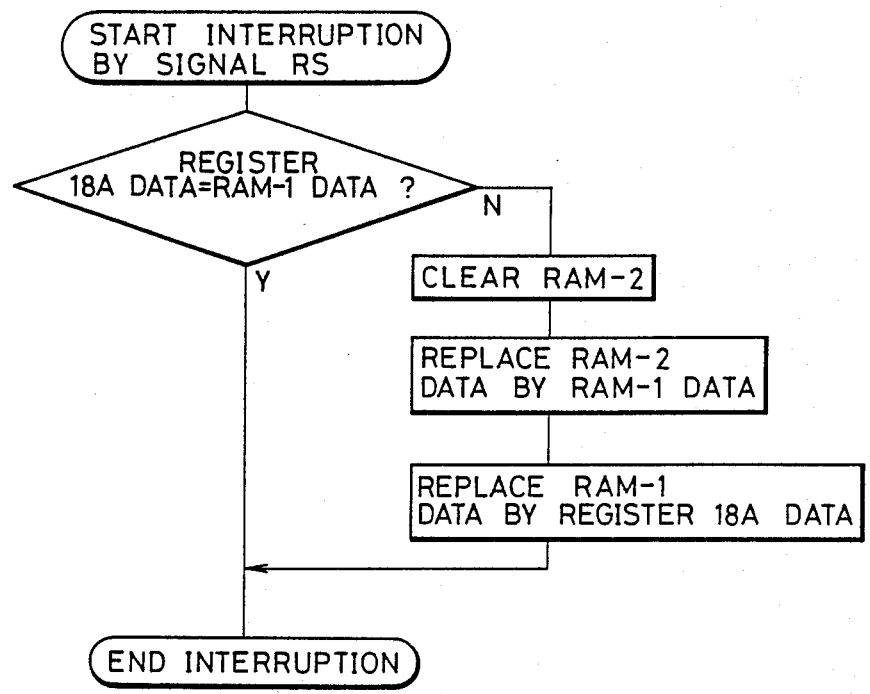
FIG. 6 is a flow chart showing a process for writing data as to the next-most-recent shooting date.

Referring now to FIG. 6, shown therein is an operation sequence provided in order to store data as to the next-most-recent shooting date in the RAM-2. Specifically, if, upon an operation of the shutter actuation button 30, the data as to date in the register 18A does not correspond to the data as to the most recent shooting date in the RAM-1, the next-most-recent shooting date presently stored in the RAM-2 is replaced with the date of the most recent shooting date in the RAM-1. Therefore, more than one shot made on the same day never renews the data as to next-most-recent shooting date in the RAM-2. Therefore, the next-most-recent shooting date can be known even if, for example, shutter operations are performed for the purpose of testing or checking.

Figure 7:
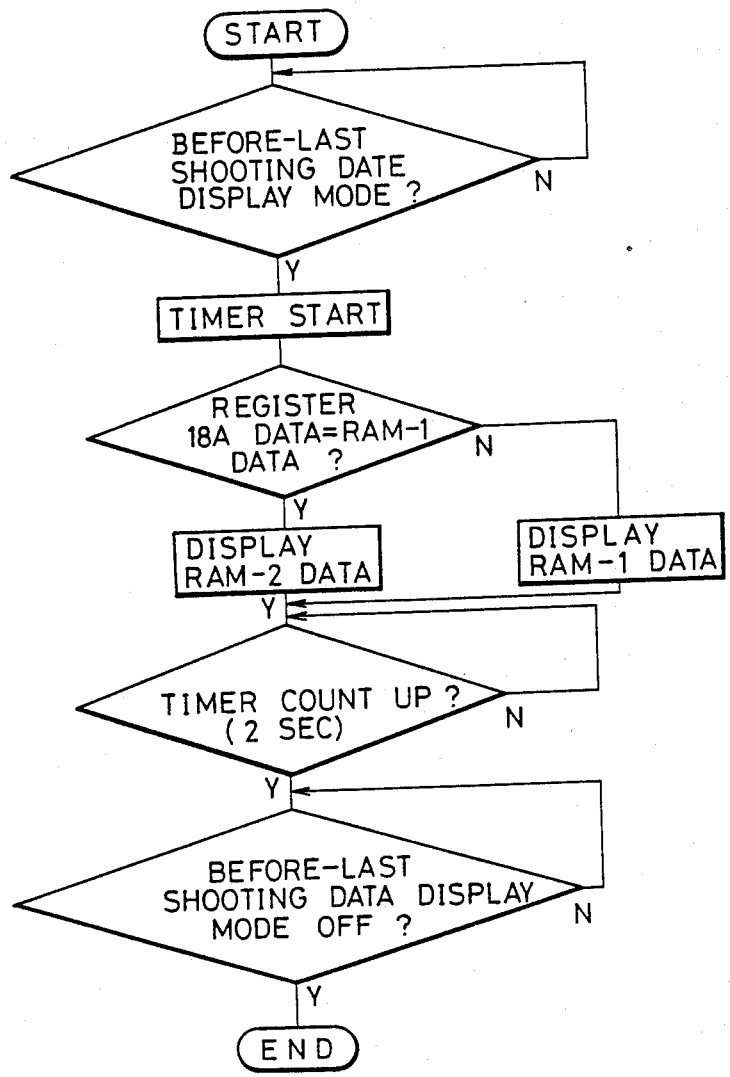
FIG. 7 is a flow chart showing a process for display the next-most-recent shooting date.

The "before-last shooting date display" mode can be maintained during the operation of the shift switch 8. As is shown in FIG. 7, a two-second count timer is provided in order to display a next-most-recent shooting date for at least two seconds. Due to this two-second count timer for allowing two-second display, it is possible to confirm the next-most-recent shooting date even if the shift switch 8 is turned off just after its operation or due to chattering thereof.

It is to be understood that as many birth dates can be displayed as the number of RAM elements of the RAM unit 22. It is permissible to provide special switches for setting the birth date recording mode and birth date entry mode which are, in the above-described embodiment, effected by the mode selection switch 7 and the shift switch 8, respectively.

Figure 11:
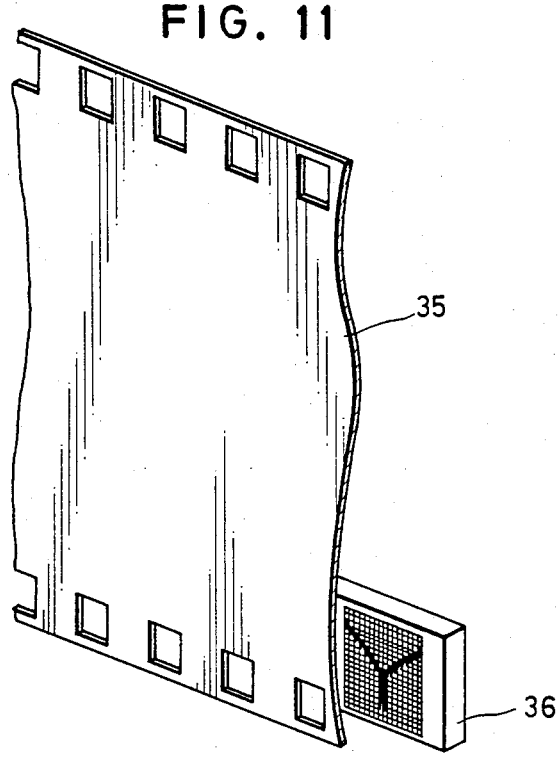
FIG. 11 is a schematic fragmentary perspective view of one example of the dot matrix display panel.

Reference is now had to FIGS. 8 to 11, showing another preferred embodiment of the data recording camera according to the present invention which has a recording unit 33 attached to a back cover 32 pivotally mounted on a camera body 31 for opening and closing movement. This data recording unit 33 includes a display panel 343 such as a liquid crystal display panel for displaying data thereon in such a way as to be visible outside the camera and a printing dot-matrix display panel 36 disposed inside the back cover 32 so as to record data displayed thereon on a film in the camera. As is shown in FIG. 11, the dot matrix display panel 36 comprises a large number of light emitting diodes (LED's) arranged in a matrix, for example a 16 rows, 16 columns matrix.

The display panel 34 has mode indicators 38 to 41 which are selectively activated according to the display modes to which the camera is set. For setting these modes, there is a mode setting button 42 which is operated intermittently to set a "time recording" mode, an "off-recording" mode, a "name recording" mode, a "name entry" mode, and a "date recording" mode in this order. Each mode selected is indicated by the corresponding mode indicator 38, 39, 40, 41 except the off-recording mode.

Figure 9:
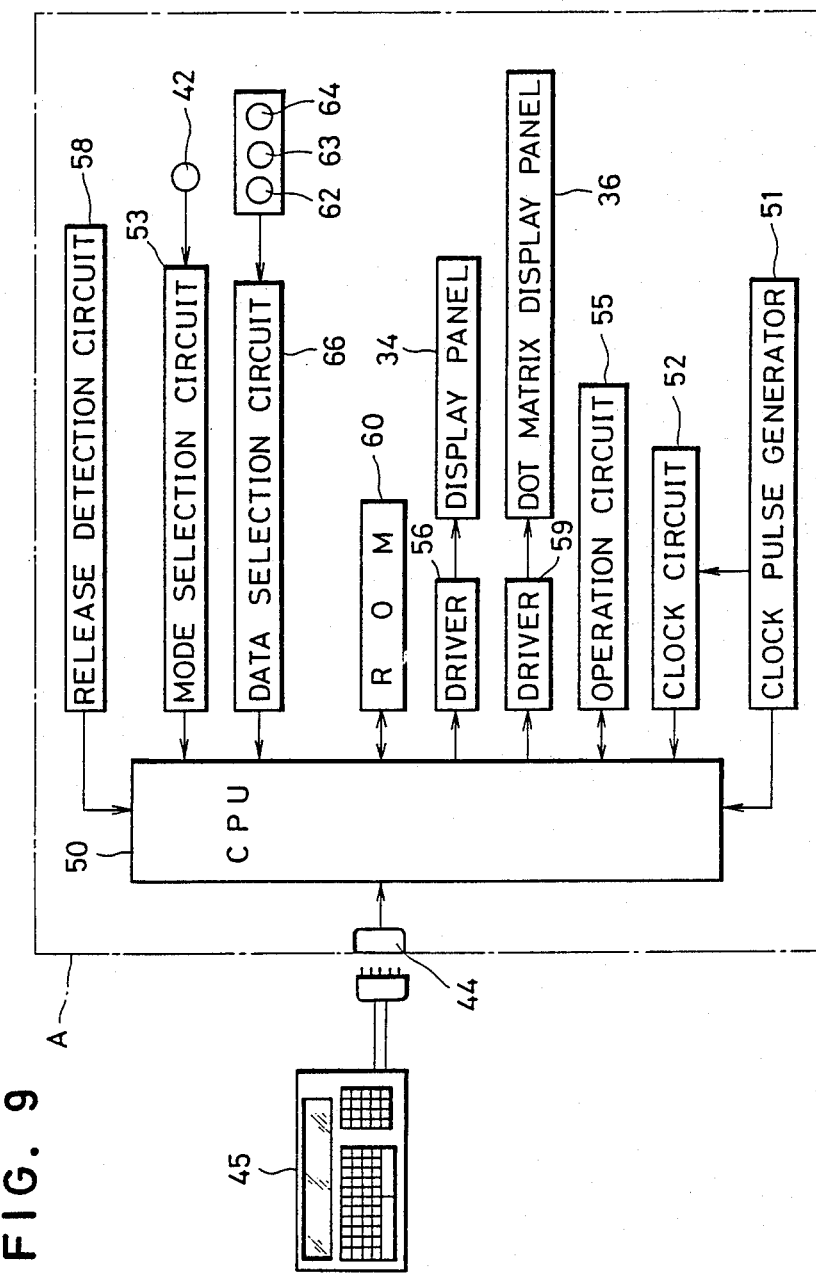
FIG. 9 is a functional block diagram showing one example of the data recording circuit of the data recording camera of FIG. 8.

FIG. 9 shows an electrical circuit A of the data recording unit according to the present invention. The circuit A has a connector 44 attached to the back cover 32 for connecting a data input device 45 thereto. This data input device 45 may be a simplified word processor and is used to enter pattern data as to letters, numerals, and the like into a CPU (central processing unit) 50 so as to display names, dates or the like as will be described later.

Connected to the CPU 50 is a clock circuit 52 which provides data as to the date and time based on a clock pulse from a clock pulse generator 51 and an operation circuit 55 which calculates a date based on the data as to date and time from the clock circuit 52 when the mode setting button 42 is operated to select the "date recording" mode which is set in the CPU 50 through a mode selection circuit 53. The data as to the date thus calculated is transmitted to a driver 56 which causes the display panel 34 to display the data as to date as figures thereon.

When a shutter actuation button is actuated during the "date recording" mode, a recording signal is provided by a release detection circuit 58 and transmitted to the CPU 50. As a consequence, a driver 59 is caused to drive the dot matrix display panel 36 so as to display the same figures, namely the date, as appear on the display panel 34. Accordingly, the film 35 is exposed to LED's emitting light to form figures corresponding to the date.

Figures 8, 10:
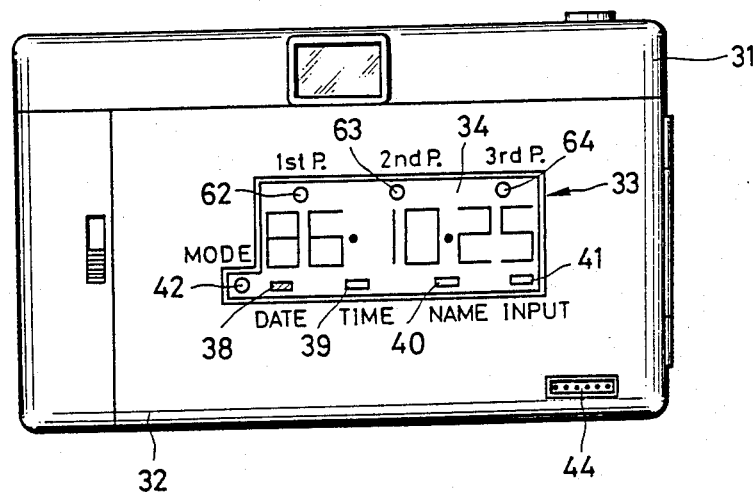
FIG. 8 is a rear view of the data recording camera of another preferred embodiment according to the present invention.
FIG. 10 is a series of illustrations showing various patterns of display of the liquid crystal display device.

Upon recording a date on the film 35, pattern data as to letters stored in a ROM 60 is used to display letters such as "Year", "Month" and "Day" which are also recorded on the film 35 as well as the date as is shown in FIG. 10(A). It should be noted that although the display panel 34 is a liquid crystal panel capable of displaying six seven-segment digits and two dots, for example "86 10 25" as is shown in FIG. 8, nevertheless the display device 34 itself may take any of various forms well known to those skilled in the art and already commercially available, such as dot matrix display devices, in order to display the same data as on the dot matrix display panel 36.

When the mode setting button 42 is operated again to select the "time recording" mode, the dot matrix display panel 36 displays the current time thereon as is shown in FIG. 10(B) and records the time on the film 35. If the "off-recording" mode is selected by another operation of the mode setting button 42, nothing is displayed on the dot matrix panel 34 and therefore no data is recorded on the film 35.

In the "name recording" mode, the mode indicator 40 is actuated to indicate that the name and age of an individual will be displayed on the dot matrix display panel 36 as is shown in FIG. 10(C) and accordingly recorded when an exposure is made. Specifically, in order to display a name and age on the dot matrix display panel 36, the CPU 60 retrieves pattern data as to letters stored in the ROM 60 by which the driver 59 is driven. On the other hand, the operation circuit 55 calculates the age based on the data as to the current date and time from the clock circuit 52 and the data as to birth date in the ROM 60 and provides the data as to age by which the driver 59 is driven, so as to cause the dot matrix display panel 36 to display the age thereon.

As was previously described, the data as to letters and birth date can be written in the ROM 60 by means of the data entry device 45 which is available at, for example, a photo-shop. For the entry of data as to name and birth date, the mode setting button 42 is operated to select the "name entry" mode before entering the data as to name and birth date through keys of the data entry device 45. The data as to name and birth date can then be actually entered and stored in the ROM 60 by operating an entry button 62.

The ROM 60, in this embodiment, has a capacity sufficient to store data as to name and birth date for three individuals. Therefore, the data recording unit 33 is provided with three data entry buttons 62 to 64 corresponding respectively to these three individuals. Each data entry button 62, 63, 64 is also operated to retrieve the data as to the name and age of a corresponding individual. For example, when the data entry button 63 is operated in the "name recording" mode, a selection circuit 66 is activated so as to retrieve the data has to name and birth date of the corresponding individual from the ROM 60. In such a way, the name and age of that selected individual is displayed on the dot matrix and thereby recorded on the film 35.

Figure 12:
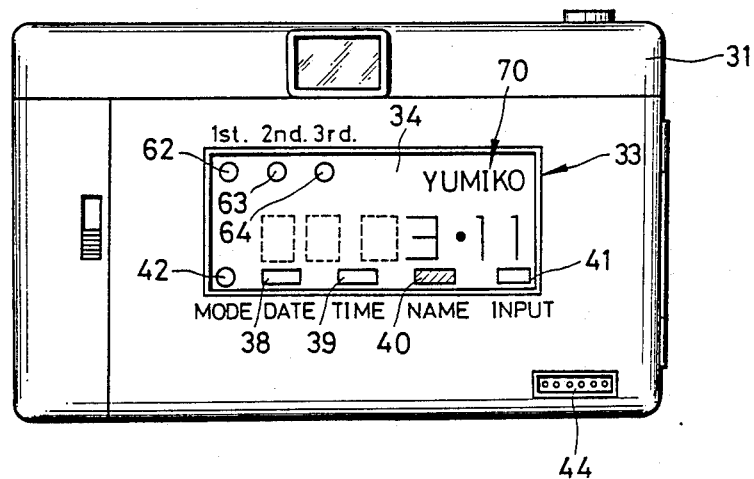
FIG. 12 is a rear view showing the data recording camera of still another preferred embodiment according to the present invention.

FIG. 12 shows another embodiment of the present invention wherein a name can be displayed on the recording data display panel 34. For the display of a name, the dot matrix display panel 34 includes a name display part 70 comprising a large number of dot-shaped liquid crystal elements and small lamps for illuminating the respective liquid crystal elements arranged in the form of a dot matrix.

Although the present invention has been fully described by way of the preferred embodiments thereof with reference to the accompanying drawings, it is to be noted that various possible changes and modifications will be apparent to those skilled in the art. Therefore, unless otherwise such changes and modifications depart from the true scope of the present invention, they should be construed as being included therein.

What we claim is:

1. A data recording camera capable of photographically recording a date, comprising:

first memory means for storing data as to the most recent shooting date;

second memory means for storing data as to the birth date of an individual;

operation means for calculating the age of said individual based on said data stored in said first and second memories;

a liquid crystal display device for digitally displaying said calculated age thereon; and a light source for illuminating said liquid crystal display device to photographically record said age on a film in said data recording camera.

2. A data recording camera as defined in claim 1, wherein said first and second memory means and said operation means are incorporated in a single chip of a microcomputer.

3. A data recording camera as defined in claim 1, wherein a clock circuit is incorporated to provide data as to said most recent shooting date.

4. A data recording camera capable of photographically recording a date, comprising:

a dot-pattern display member for displaying figures and letters to be photographically recorded on a film in said data recording camera;

memory means for storing pattern data as to letters and the birth date of an individual therein;

a clock circuit for providing data as to the shooting date;

operation means for calculating the age of said individual based on said data as to the shooting date and said birth date of said individual;

means for displaying said calculated age and the name of said individual on said dot-pattern display member; and a light source for illuminating said dot-pattern display member to photographically record said age and name on said film in said data recording camera.

5. A data recording camera as defined in claim 4, wherein said dot-pattern display member is a liquid crystal display panel.

6. A data recording camera, comprising:

a clock circuit for providing data as to the current date;

memory means for sorting data as to the birth date of an individual;

means for calculating the age of said individual based on said data stored in said memory means and based on the operation of said clock circuit; and means for photographically recording on a film in said camera said calculated age.

7. A data recording camera as defined in claim 6, and means for recording on said film also the name of said individual.

8. A data recording camera as defined in claim 6, and means for recording on said film also the current date.

* * * * *